United States Patent [19]

Metzger et al.

[11] Patent Number: 5,531,947
[45] Date of Patent: Jul. 2, 1996

[54] PROCESS AND INSTALLATION FOR THE MANUFACTURE OF PENCILS

[75] Inventors: Burkhard Metzger; Hans Ziolkowski, both of Ingelheim, Germany

[73] Assignee: Bellaform Extrusionstechnik GmbH, Ingelheim, Germany

[21] Appl. No.: 240,789

[22] PCT Filed: Sep. 12, 1992

[86] PCT No.: PCT/EP93/02461

§ 371 Date: May 13, 1994

§ 102(e) Date: May 3, 1994

[87] PCT Pub. No.: WO94/06615

PCT Pub. Date: Mar. 31, 1994

[30] Foreign Application Priority Data

Sep. 15, 1992 [DE] Germany ............. 42 30 793.7

[51] Int. Cl.⁶ .................................................. B29C 47/02
[52] U.S. Cl. ................. 264/102; 264/149; 264/171.13; 264/171.23; 264/173.17; 264/173.18; 264/237; 425/113; 425/131.1; 425/379.1
[58] Field of Search ................... 264/174, 172, 264/237, 102, 349, 149, 171.11, 173.18, 173.17, 171.23; 425/113, 379.1, 131.1

[56] References Cited

U.S. PATENT DOCUMENTS

| | | | |
|---|---|---|---|
| 1,937,104 | 11/1933 | Thomsen | 425/113 |
| 2,408,398 | 10/1946 | Johnson | 264/172 |
| 2,790,202 | 4/1957 | Lorenian | 264/172 |
| 2,988,784 | 6/1961 | Lorenian | 264/172 |
| 3,704,071 | 11/1972 | Muller et al. | 401/96 |
| 3,765,811 | 10/1973 | Sawada | 264/172 |
| 3,983,195, | 9/1976 | Arons et al. | 264/174 |
| 4,006,209 | 2/1977 | Chiselko et al. | 264/349 |
| 4,017,451 | 4/1977 | Ishida et al. | 264/211 |
| 4,065,532 | 12/1977 | Wild et al. | 264/102 |
| 4,902,455 | 2/1990 | Wobbe | 264/102 |

FOREIGN PATENT DOCUMENTS

| | | | |
|---|---|---|---|
| 121067 | 7/1976 | Germany . | |
| 3744193 | 1/1989 | Germany . | |
| 3733060 | 9/1989 | Germany . | |
| 52-70618 | 6/1977 | Japan | 264/174 |
| 58-155935 | 9/1983 | Japan | 264/174 |

*Primary Examiner*—Jeffery R. Thurlow
*Attorney, Agent, or Firm*—Michael D. Bednarek; Marks & Murase

[57] ABSTRACT

In the course of the process of manufacturing pencils the polymer binding material is at first melted in a lead extruder (19) in order to manufacture the lead. To the melted polymer material is then added via a loading extruder (2) a mixture of additives in powder form such as colors, gliding and adhesive substances. After intensive mixing of the components in the lead extruder (1) a lead profile (13) is extruded which is cooled in a first cooling range (3) to the point where, upon entering the coating nozzle (6), it is not fully plastic anymore but also not completely cold. Through the coating extruder (4) and (5) the appropriate materials are introduced for the formation of the pencil coating. In the course of the subsequent second cooling range (8) the pencil profile is cooled down completely and after passing the withdrawal station (11) it is cut in a sawing station (12).

15 Claims, 3 Drawing Sheets

PROCESS AND INSTALLATION FOR THE MANUFACTURE OF PENCILS

FIELD OF THE INVENTION

The invention concerns a process for the manufacture of pencils with a firm lead and at least one coating whereby Polymer is be used as a binding material and the lead material and the coating material are extruded. The invention also concerns an installation to implement this process with a lead extruder and at least one coating extruder connected with the coating nozzle.

BACKGROUND OF THE INVENTION

Several requirements are made of pencils, whereby the characteristics essentially depend on the quality of the lead. A pencil must be, among other things, easily sharpened, which depends, on one hand, on how hard the coating is and, on the other hand, because of the impacting torsion, on how brittle the lead is; it also depends on the adhesion between lead and coating material. Variations in the thickness of the lead also tend to be of a disadvantage. In addition, the lead in the coating material should not be subjected to varying tensions or show fractures, which can easily occur during the manufacturing process.

Pencils tend to be made increasingly of synthetics, whereby profiles are being extruded; they are subsequently cut to the length of a pencil. As binding material in the material of the lead and the coating various polymers are used, preferably SAN or ABS Polymers, to which, in turn, appropriate additional substances such as color, gliding and adhesive substances and possibly filling substances can be added.

Even though the characteristics of the pencils are basically determined by the materials used, it has become clear that the manufacturing process also has a significant influence on the characteristics of a pencil.

The DE-OS 20 30 578 shows a device to manufacture and/or coat skein profiles, in particular for pencils. According to an operational formula an already pre-fabricated skein profile such as a wire, a rope, a tube or a similar device is entered in the skein compression nozzle, where the coating of the skein profile takes place. This process is not suited for the manufacture of pencils because pre-fabricated lead breaks very easily and is difficult to handle. A further disadvantage is that the pre-fabricated lead also breaks easily when it is put into contact with the hot coating material, because the differences in temperature between the lead and the coating material inevitably cause tension in the lead material.

DE-OS 20 30 578 also suggests that, immediately prior to the coating, the skein profile, which is to be coated, should be extruded. The nozzle is formed in a manner that it serves simultaneously as a feed into a second skein compression nozzle. This process, however, has the disadvantage that the lead is still plastic when the coating is being extruded on to it. If the compression of the coating material is very strong, a deformation of the lead occurs. This can lead not only to variations in thickness, but also to a complete failure to produce the lead.

The DE-PS 38 27 968 shows a process where all lead components are at first ground to the size of grains of corn and subsequently mixed in a turbomixer. In the turbomixer, a set temperature control is required because the mixture has to be regranulated before it reaches the extruder. In the lead extruder, the mixture goes through a filling zone, a passage zone, a compression zone and a extruder-head zone, whereby the temperature increases up to the extrusion zone and then decreases somewhat at the extruder head. This process is complicated and not very flexible because of the preparation of the lead components when, for example, the hardness of the lead is to be changed.

The DE-AS 22 03 635 shows a pencil with synthetic coating. The manufacture of the lead occurs in two operational stages with the interposition of a drying stage. In the first stage, for example, a mixer thoroughly mixes ABS-resin powder, graphite powder and calcium stearate. After drying, the mixture is extruded at about 170 degree Celsius with the use of an extruder and then, while still hot, is cut to create the materials for the pencil core. The coating is done the same way as the coating of wires. Wires, however, are pre-fabricated and are rolled off a spool and then led to an extruder. This means that the wire, which in this case would correspond to the lead, is totally cooled off and consequently fully hardened. It is also mentioned that after the extrusion the lead is introduced continuously in a crosshead nozzle for coating purposes. Because the lead is entered into the coating nozzle right away, it is still plastic and can be shaped.

The DE-AS 28 03 206 shows a foaming mixture, particularly for the coating of the lead. The mixture comes from a skein press with a transverse nozzle in which simultaneously and continuously the synthetic lead is measured and pressed out through another skein press. The emerging six-edged profile is calibrated and subsequently cut at the appropriate classic pencil length. The surface of the pencils manufactured in this manner can be improved with a layer of varnish or a triple nozzle is used and the surface is covered with a thin decorative layer made of stiff synthetics. In the course of this well-known process the plastic lead material is coated, which results in considerable disadvantages because of variations in thickness.

SUMMARY OF THE INVENTION

The task of the invention is therefore a process and an installation which permits a flexible manufacture of pencils of different levels of hardness with less work, whereby the manufactured pencils should show a better quality: namely, the lead should not break easily and the pencil should be easily sharpened. This task is accomplished in a process according to the present invention.

The invention derives from the recognition that a greater flexibility will be achieved when the polymer binding material and the other components of the lead material are prepared and introduced into the extruder separately. The hardness of the lead depends on the additional substances, such as colors, gliding and adhesive materials as well as suitable filling materials. They are materials in powder form which are mixed and prepared independent of the polymer binding materials. If the hardness of the lead or maybe the color should be changed, the mixture of the additives can be changed independently of the utilized polymer binding material. Several mixtures can be prepared as well, which can be added to the already melted polymer binding materials according to preference.

Because the polymer binding material is already in a melted state when the powder additives are introduced, a relatively fast mixing of all components occurs. After the mixing, the lead material is extruded in the form of a lead profile which is subsequently cooled off. It is important that the cooling does not go beyond the point where the lead profile is not plastic anymore. This provides the advantage that the lead profile cannot be shaped upon extrusion of the coating and no variations in the thickness can occur. Also, the temperature is still so high that the difference to the temperature of the extruded coating materials cannot cause any tension in the lead profile. Particularly, when the same polymers or similar polymers are used as binding materials for the lead material as well as the coating material, whereby the polymers show approximately the same melting range, the difference in temperature amounts to only a few degrees Celsius or multiple tens of degrees Celsius, so that the advantages of a lead that is not plastic anymore can be combined with the advantages of a lead at a higher temperature, only after coating and completion of the pencil profile does the pencil profile completely cool off.

The melting of the binding material and the mixing of the additives in powder form take place in an extruder which is described within the context of the installation of the manufacture of pencils.

The temperature of the melted polymer substance is increased continually until the mixture in powder form is added, because a low viscosity of the melted polymer substance facilitates the mixing of the additives in powder form. After adding the additive, the temperature is somewhat lowered and subsequently raised to the level of the extrusion temperature, whereby the lowering of the temperature goes only to the point at which the binding material remains melted. The temperature of the melted polymer substance may not be raised to the level that would result in a depolymerization. It has been shown to be an advantage when the mixture of the lead materials, after introduction of the additives, undergoes not only at least one mixing process but at least also one kneading cycle. It is preferable that the mixture be subjected to two or three consecutive mixing and kneading cycles, whereby the subsequent mixing and kneading cycle takes place at increasingly higher temperatures.

To avoid bubbles in the lead, which would reduce the stability of the lead, a degasification takes place in the course of the introduction of the additives. Preferably after the last mixing and kneading cycle or during the last mixing and kneading cycle, an degasification of the lead materials should take place.

Depending on the desired pencil type and the required colorization, two or more coatings can be added to the lead profile. Preferably two coatings are extruded simultaneously onto the lead profile whereby the outer coating is formed as a thin colored layer.

The pencil profile is to be calibrated immediately after the extrusion of the coating materials.

The installation for this process consists of a lead extruder with a first and a second loading station. At least one melting and transportation range exists between the first and the second loading station, and at least one mixing and kneading range exists behind the second loading station. Between the lead extruder and the coating nozzle a first cooling range and behind the coating nozzle a second cooling range is planned.

The lead extruder is of modular construction so that the individual melting, transportation, mixing and kneading ranges can be matched with the respective materials.

The second loading station is connected to a load extruder which, in turn, is fed by a dosage installation, preferably a graphimetric dosage installation. Through the second loading installation the additives in powder form are introduced to the polymer melting material which is located in the extruder. The temperature range in the one or more heating and transportation ranges between the first lading station and the second loading station was chosen so that the temperature continues to increase between the first loading station and the second loading station and so that a melting process with the desired viscosity takes place within the area of the second loading station. Preferably, a degasification station is part of the second loading station in order to remove, at an early stage of the preparation of the lead material, the gases which could lead to bubbles in the subsequently manufactured leads. In order to be certain that the all the gases in the lead material can escape, a second degasification station is foreseen for the area of the last mixing and kneading range.

The cooling range can contain a variety of cooling temperatures. In the area of the cooling range also installations to lead the extruded lead profiles can be projected. Preferably, the cooling range remains simply a free space between the lead extruder and the coating nozzle. In this free space the extruded, free-hanging lead profile is being led to the nozzle, whereby it suffices if the air in this open space is at room temperature. Additional installations are not necessary if the length of the first cooling range is set in accordance with the withdrawal speed of the lead profile so that the desired temperature reduction of the lead profile can be achieved.

Behind the coating nozzle a calibrating station exists, whereby preferably the calibrating station forms at least a part of the second cooling range.

DETAILED DESCRIPTION

Figure 1:
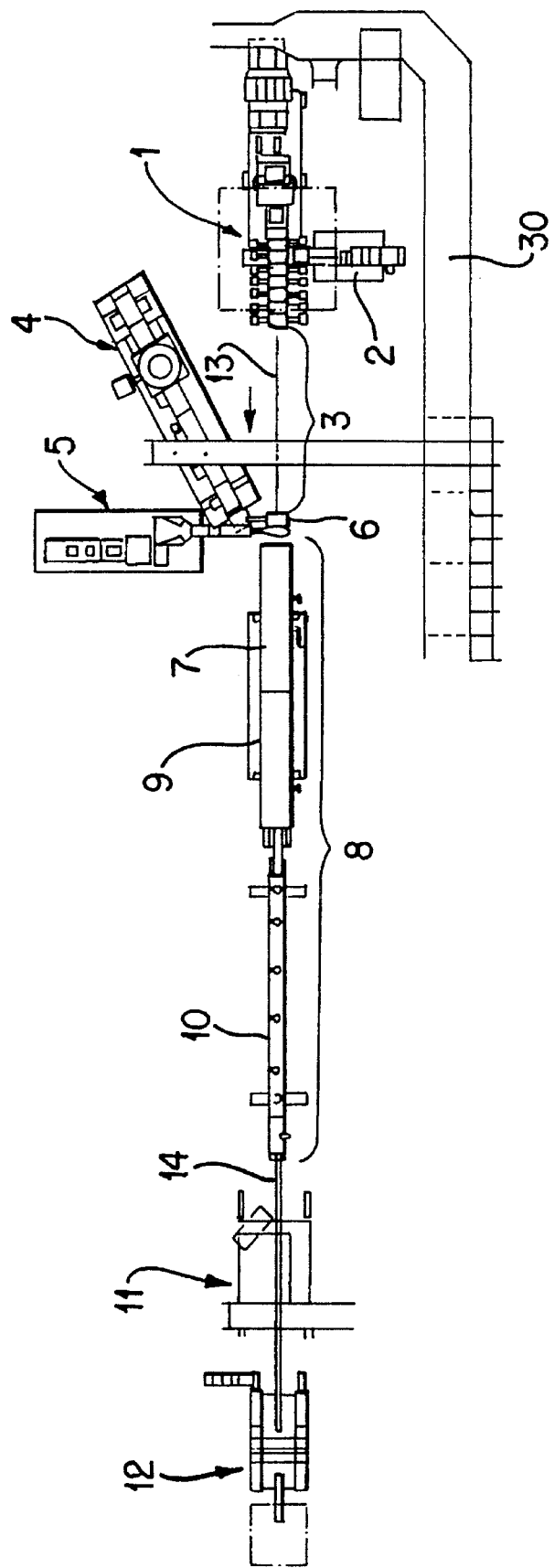
FIG. 1 the view of the installation from above

FIG. 1 shows the installation of the pencils from above. At the side of the lead extruder 1 a load extruder 2 for the transport of the additives is flanged for the purpose of the melting of the polymer. The lead profile 13 that is extruded from the lead extruder runs through a cooling range 3 and enters the coating nozzle 6 where a first and a second coating extruder 4,5 are connected. The coating extruder 4 leads the material for the lead coating to the coating nozzle 6. Simultaneously, the second coating extruder 5 introduces material for the application of an outer layer, preferably a colored layer, to the coating nozzle 6. Both coating materials are simultaneously extruded in the nozzle 6 onto the lead profile 13. The extrusion happens so that the pencil profile 14 is extruded immediately behind the coating nozzle 6 into a calibrating station 7, which forms a part of the second cooling range 8. The second cooling range 8 consists of two cooling vats 9 and 10 (shown in the enclosed reproduction), which are filled with a cooling liquid, for example with water. At the end of the second cooling vat 10 a water wiper is located and the pencil profile 14 arrives at a withdrawal station and after that at a sawing station 12, where a saw is set up to separate the individual pencils of the pencil profile 14. The lead extruder 1 as well as the coating extruder 4,5 and the withdrawal station 11 are connected with a joint switch station 30.

Figure 2:
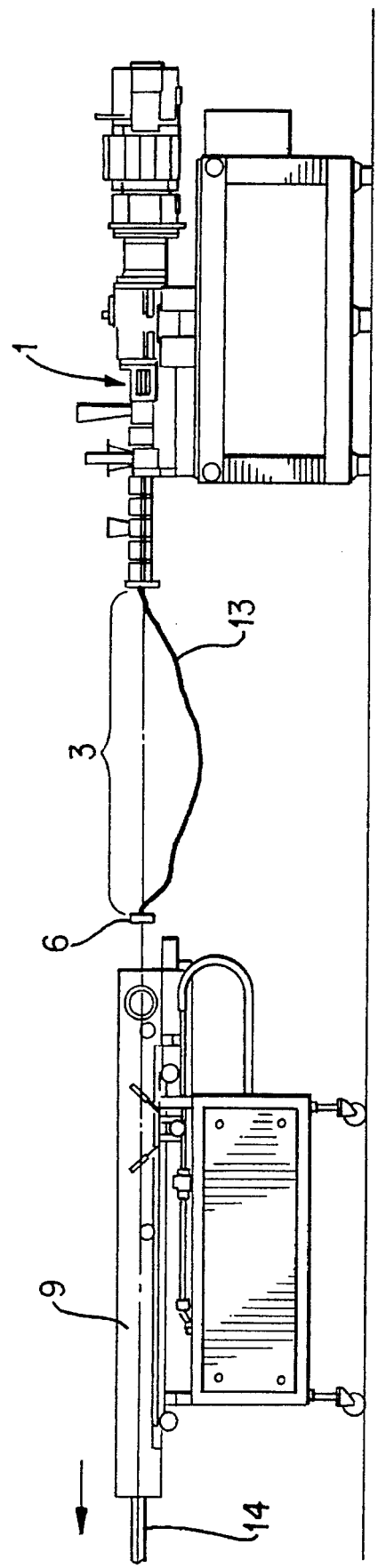
FIG. 2 a part of the side view of the installation.

FIG. 2 shows the frontal part of the installation from the side. The first cooling range 3 consists of an open space between the lead extruder 1 and the coating nozzle 6, where the extruded lead profile 13 is conducted freely to the coating nozzle 6. The extruded lead profile 13 shows such a great stability that it does not tear in the first cooling range 3. The first cooling range permits visual control of the extruded lead profile 13. At the end of the first cooling range 3, the lead profile 13 has cooled off to a point that it is not plastic anymore when it is introduced to the coating nozzle. If the length of the first cooling range is properly adjusted to the withdrawal speed of the lead profile 13, it suffices also if the surrounding air in this open space of the cooling range 3 is at room temperature.

Figure 3:
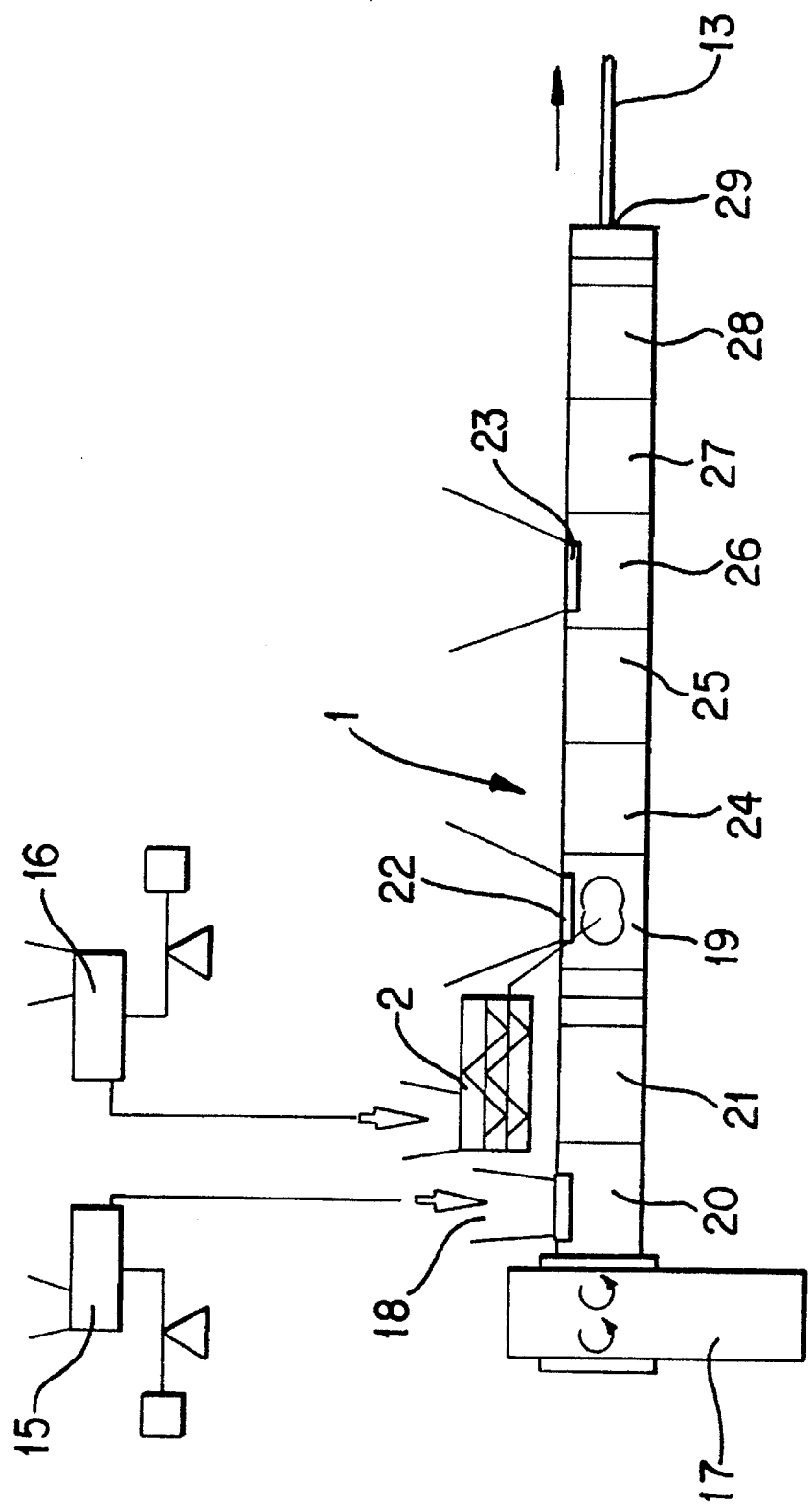
FIG. 3 the composition of the lead extruder in schematic representation.

FIG. 3 shows the lead extruder in a schematic manner. This lead extruder 1 is a double worm extruder with various range sections and stations which can be put together in a modular manner. Next to the propulsion 17 is the first loading station 18 through which the polymer binding material is introduced to the lead extruder 1 via a first dosage installation 15, which can be a gravimetric dosage installation. In the area of the first loading station 18, a first melting and transportation range 20 is planned which heats the approaching polymer material beyond the melting temperature and transports it to a second melting and transportation range 21, where a further melting of the polymer material takes place. Subsequently, the polymer material, heated to an high temperature, arrives at the second loading station 19 where the additives, such as graphite, adhesive and gliding substances as well as possible filling substances are introduced as a powder mixture from a gravimetric second dosage installation 16. In the area of the second loading station 19 also a heating and transportation range is planned, equipped with a first degasification station 22. In addition to the second loading station 19, a total of three mixing and kneading ranges 24, 25 and 26 exist whereby the third mixing and kneading range shows a second degasification station 23. In addition to the second degasification station 23, a transportation range 27 as well as the compression range 28 exist, which terminates at the extruder head 29 out of which the lead profile 13 is extruded.

This installation can manufacture pencils which, for example, contain Polystyrol as binding material. The Polystyrol, which represents about 10 to 40% of the weight of the lead material, is introduced in granular form to the first loading station where it is heated to approximately 240 degrees Celsius on the way to the second loading station. The second loading station introduces a mixture of graphite in powder form, which represents 50 to 70% of the weight of the lead material, as well as stearic acid and calcium stearate with shares of 2 to 5% of the weight resp. 2 to 10% of the weight. The temperature in the subsequent mixing and kneading ranges 24 to 26 amounts to 190 to 200 degrees Celsius. This temperature is maintained in the area of the transportation range 27 as well the compression range 28 and the lead material on the extruder head 29 is extruded at about this temperature. In the area of the first cooling range 3 the cooling down to about 190 degrees Celsius takes place, a temperature that permits a hardening of the lead material to a point where it cannot be shaped upon its introduction into the coating nozzle 6. Polystyrol can be used as coating material as well as binding material and represents a share of 60 to 70 percent of the weight. The coating material can continue to show LDPE filled with talcum as well as color batches and propellant of up to 30 to 40 percent of the weight. The outer layer, which is also extruded onto the pencil in the coating nozzle 6 can also show Polystyrol which contains a share of more than 50 percent of the weight. In addition, the material for the outer layer contains color batches so that the pencil can be finalized in color.

The process evolves in a manner that the extrusion of the coating comes first and than the lead extrusion takes place.

The beginning of the lead profile is introduced in the coating nozzle and grabbed and pulled along by the extruded coating material.

A perfect example of the temperature ranges for the lead materials which show Polystyrol as binding material can be seen in the following table.

TABLE

|   | Centigrades |
|---|---|
| 1. Melting and Transportation range (20) | 140–180 |
| 2. Melting and Transportation range (21) | 160–220 |
| 2. Loading station (19) | 140–240 |
| 1. mixing and Kneading range (24) | 150–190 |
| 2. Mixing and Kneading range (25) | 150–200 |
| 3. Mixing and Kneading range (26) | 160–200 |
| Transportation range (27) | 150–200 |
| Compression range (28) | 150–200 |
| End of the 1st Cooling range (3) | 140–190 |

Reference List:

1 Lead Extruder
2 Coating Extruder
3 First Cooling Range
4 First Coating Extruder
5 Second Coating Extruder
6 Coating Nozzle
7 Calibrating Station
8 Second Cooling Range
9 First Cooling Vat
10 Second Cooling Vat
11 Withdrawal Station
12 Sawing Station
13 Lead Profile
14 Pencil Profile
15 First Dosage Installation
16 Second Dosage Installation
17 Propellant
18 First Loading Station
19 Second Loading Station
20 First Melting and Transportation Range
21 Second Melting and Transportation Range
22 First Degasification Station
23 Second Degasification Station
24 First Mixing and Kneading Range
25 Second Mixing and Kneading Range
26 Third Mixing and Kneading Range
27 Transportation Range
28 Compression Range
29 Extruder Head
30 Switching Installation

What is claimed is:

1. Process to manufacture pencils with a firm lead and at least one coating, whereby polymer is used as a binding material and the lead material and the coating material are extruded, comprising the steps of:

melting the polymer binding material to manufacture the lead, adding a mixture in powder form consisting of known additives such as colors, gliding and adhesive substances and possibly filling substances to the melted polymer substance whereby the melting of the binding material and the mixing of the additives in powder form take place in an extruder, mixing the melted polymer material with the additional substances the lead material is extruded as a lead profile, cooling the lead profile only to the point that the lead profile is not plastic anymore, extruding the coating material for the formation of the pencil profile onto the cooled but not yet cold lead profile, and subsequently cooling the pencil profile completely.

2. Process according to claim 1, wherein the temperature of the melted polymer substance is increased continuously until the additive mixture in powder form is added, after the addition of the additives the temperature is lowered and subsequently again raised to the extrusion temperature, whereby the temperature decrease goes only to the point where the binding material still exists as a melted substance.

3. Process in accordance with claim 1, wherein after the addition of the additives the mixture undergoes at least one mixing and kneading cycle.

4. Process in accordance with claim 3, wherein the mixture undergoes at least two subsequent mixing and kneading cycles, whereby the respective subsequent mixing and kneading cycle takes place at a higher temperature than the previous mixing and kneading cycle.

5. Process in accordance with claim 1, wherein a degasification takes place during the introduction of the additives.

6. Process in accordance with claim 1, wherein a degasification takes place after the last mixing and kneading cycle.

7. Process in accordance with claim 1, wherein two coatings are extruded onto the lead profile simultaneously, with the outer layer being formed as a thin layer of color.

8. Process in accordance with claim 1, wherein the pencil profile is calibrated immediately after the extrusion of the coating material.

9. Process in accordance with claim 8, wherein the pencil profile is cooled during calibration.

10. An apparatus for manufacturing pencils that includes a lead extruder and at least one coating extruder that is connected with a coating nozzle, wherein the lead extruder (1) includes a first loading station (18) and a second loading station (19) at least one melting and transportation range (20, 21) and at least one mixing and kneading range (24, 25, 26) downstream of the second loading station (19), a first cooling range (3) between the lead extruder (1) and the coating nozzle (6) and a second cooling range (8) downstream of the coating nozzle (6).

11. The apparatus of claim 10, wherein the second loading station (19), is connected with a loading extruder (2).

12. The apparatus of claim 10, wherein a first degasification station (22) is integrated in the second loading station.

13. The apparatus of claim 10, wherein at least one mixing and kneading range (22–26) and a second degasification station is located downstream of the first degasification station (22).

14. The apparatus of claim 10, wherein a calibrating station (7) is located downstream of the coating nozzle.

15. The apparatus of claim 14, wherein the calibrating station (7) forms at least one part of the second cooling range (8).

* * * * *

UNITED STATES PATENT AND TRADEMARK OFFICE
CERTIFICATE OF CORRECTION

PATENT NO.     : 5,531,947
DATED          : July 2, 1996
INVENTOR(S)    : Burkhard METZGER et al.

It is certified that error appears in the above-identified patent and that said Letters Patent is hereby corrected as shown below:

On the cover page, Item [22], "Sept. 12, 1992" should read --Sept. 12, 1993--.

Signed and Sealed this

Eighth Day of July, 1997

Attest:

BRUCE LEHMAN

*Attesting Officer*     Commissioner of Patents and Trademarks